US011899193B2

(12) United States Patent
Cassady et al.

(10) Patent No.: US 11,899,193 B2
(45) Date of Patent: Feb. 13, 2024

(54) SHAPED REFLECTOR FOR ALTERNATIVE MICROSCOPY LIGHTING TECHNIQUES

(71) Applicant: VIAVI Solutions Inc., San Jose, CA (US)

(72) Inventors: Kevin Cassady, Monroe, WA (US); Jay Gregory Brace, Seattle, WA (US); Robert Matthew Adams, Ottawa (CA)

(73) Assignee: VIAVI Solutions Inc., Chandler, AZ (US)

( * ) Notice: Subject to any disclaimer, the term of this patent is extended or adjusted under 35 U.S.C. 154(b) by 244 days.

(21) Appl. No.: 17/443,187

(22) Filed: Jul. 22, 2021

(65) Prior Publication Data

US 2022/0291492 A1     Sep. 15, 2022

Related U.S. Application Data

(63) Continuation-in-part of application No. 17/249,786, filed on Mar. 12, 2021.

(51) Int. Cl.
*G02B 21/00* (2006.01)
*G02B 6/38* (2006.01)
*G02B 6/35* (2006.01)

(52) U.S. Cl.
CPC ......... *G02B 21/0008* (2013.01); *G02B 6/352* (2013.01); *G02B 6/3825* (2013.01); *G02B 6/3826* (2013.01); *G02B 6/3853* (2013.01)

(58) Field of Classification Search
CPC .. G02B 21/0008; G02B 6/352; G02B 6/3825; G02B 6/3826; G02B 6/3853; G02B 21/361; G02B 6/381; G02B 21/06; G02B 21/16; G02B 21/18; G02B 21/362; G02B 21/3833; G02B 6/384; G02B 21/385; G01M 11/31
USPC ......................................................... 385/58
See application file for complete search history.

(56) References Cited

U.S. PATENT DOCUMENTS

| 4,601,551 | A | * | 7/1986 | Pettingell ............... A61D 19/04 359/387 |
|---|---|---|---|---|
| 9,841,567 | B1 | | 12/2017 | Zhou et al. |
| 2008/0177183 | A1 | | 7/2008 | Courtney et al. |
| 2014/0005555 | A1 | | 1/2014 | Tesar |
| 2016/0291257 | A1 | | 10/2016 | Huang et al. |
| 2018/0024341 | A1 | | 1/2018 | Romanowski et al. |
| 2021/0270695 | A1 | | 9/2021 | Diepstraten et al. |

OTHER PUBLICATIONS

Co-pending U.S. Appl. No. 17/249,786, entitled "Shaped Reflector for Coaxial Illumination of Non-Normal Surfaces," by Cassady et al., filed Mar. 12, 2021, 23 Pages.

* cited by examiner

*Primary Examiner* — Balram T Parbadia
*Assistant Examiner* — Rahman Abdur
(74) *Attorney, Agent, or Firm* — Harrity & Harrity, LLP (57) ABSTRACT

A microscope may receive a fiber optic connector via a connector adapter of the microscope, wherein the connector adapter includes an opening and a shaped reflective surface surrounding the opening. The microscope may align a ferrule of the fiber optic connector with the opening of the connector adapter of the microscope, wherein the ferrule includes a ferrule endface. The microscope may transmit light onto the shaped reflective surface and may receive reflected light from the ferrule endface and with a camera of the microscope.

20 Claims, 8 Drawing Sheets

SHAPED REFLECTOR FOR ALTERNATIVE MICROSCOPY LIGHTING TECHNIQUES

CROSS-REFERENCE TO RELATED APPLICATION

This Patent Application is a continuation-in-part of prior U.S. patent application Ser. No. 17/249,786, filed on Mar. 12, 2021, and entitled "SHAPED REFLECTOR FOR COAXIAL ILLUMINATION OF NON-NORMAL SURFACES." The disclosure of the prior Application is considered part of and is incorporated by reference into this Patent Application.

BACKGROUND

A microscope, such as a video microscope, may be used to view a fiber optic connector and to determine imperfections in the fiber optic connector.

SUMMARY

Some implementations described herein relate to a method. The method may include receiving a fiber optic connector via a connector adapter of a microscope, where the connector adapter includes an opening and a shaped reflective surface surrounding the opening. The method may include aligning a ferrule of the fiber optic connector with the opening of the connector adapter of the microscope, where the ferrule includes a ferrule endface. The method may include transmitting light onto the shaped reflective surface and receiving reflected light from the ferrule endface and with a camera of the microscope.

Some implementations described herein relate to a microscope. The microscope may include a connector adapter that includes an opening and a shaped reflective surface surrounding the opening, where the connector adapter is configured to align a ferrule of a fiber optic connector with the opening of the connector adapter, and where the ferrule includes a ferrule endface. The microscope may include a light source configured to transmit light to the shaped reflective surface and onto the ferrule endface and a camera configured to receive reflected light from the ferrule endface.

Some implementations described herein relate to a connector adapter. The connector adapter may include a body portion configured to connect with an optical microscope, where the body portion includes an opening that is configured to receive and retain a ferrule of a fiber optic connector, and where the ferrule includes a ferrule endface. The connector adapter may include a shaped reflective surface surrounding the opening and being configured to receive light from a light source of the optical microscope, and reflect the light, as reflected light, to a camera of the optical microscope and via the ferrule endface.

DETAILED DESCRIPTION

The following detailed description of example implementations refers to the accompanying drawings. The same reference numbers in different drawings may identify the same or similar elements.

A fiber optic connector may include a connector body that retains a cylindrical ceramic ferrule. The ferrule includes a small bore through a central axis that supports a piece of optical fiber. A flexible jacket may house the optical fiber that exits the fiber optic connector. The optical fiber is fixed in place in the bore, and the optical fiber and an endface of the ferrule are polished to a smooth finish. Typically, a chamfer or a bevel is added at a circular edge formed between the endface and a cylindrical face of the ferrule. The chamfer protects the edge from damage and facilitates insertion into mating adapters.

A microscope may use illumination to illuminate surfaces of the ferrule. Light emitted from a light source of the microscope reflects from a beam splitter (e.g., half of the light reflects, and half of the light passes through). The light reflected from the beam splitter passes through a lens of the microscope and reflects from the ferrule endface and the optical fiber. The reflected light passes back through the lens and forms an image of the ferrule endface at a camera of the microscope.

Current inspection techniques require different light sources to produce different lighting effects. For example, an oblique illumination source is required to produce oblique or dark field illumination effects, a coaxial light source is required to produce bright field illumination effects, and/or the like. This requires the microscope to be equipped with multiple light sources or switching light sources to achieve different lighting effects. Furthermore, current dark field illumination techniques require mechanical constraints of an object (e.g., a ferrule) under observation. Thus, current inspection techniques consume computing resources (e.g., processing resources, memory resources, communication resources, and/or the like), networking resources, human resources, and/or the like associated with switching light sources for different lighting effects, performing incorrect inspections of fiber optic connectors, incorrectly determining that faulty fiber optic connectors are functional, implementing faulty fiber optic connectors in networks, losing network data because of the faulty fiber optic connectors, and/or the like.

Some implementations described herein relate to a microscope that utilizes a shaped reflector for alternative microscopy lighting techniques with a single light source. For example, the microscope may receive a fiber optic connector via a connector adapter of the microscope. The connector adapter may include an opening and a shaped reflective surface surrounding the opening. The microscope may align a ferrule of the fiber optic connector with the opening of the connector adapter of the microscope. The ferrule may include a ferrule endface. The microscope may transmit light onto the shaped reflective surface and may receive reflected light from the ferrule endface and with a camera of the microscope.

In this way, the microscope utilizes a shaped reflector for alternative microscopy lighting techniques. The microscope may include a reflector with a geometry that allows illumination from a single light source to image a ferrule endface with bright field illumination, oblique illumination, or dark field illumination. The light from the light source is reflected by the reflector in such a way that subsequent light reflected from the ferrule endface passes back through a lens. The ferrule endface and the reflector may be conical and axially symmetric. This, in turn, conserves computing resources, networking resources, human resources, and/or the like that would otherwise have been consumed in switching light sources for different lighting effects, performing incorrect inspections of fiber optic connectors, incorrectly determining that faulty fiber optic connectors are functional, implementing faulty fiber optic connectors in networks, losing network data because of the faulty fiber optic connectors, and/or the like.

FIGS. 1A-1F are diagrams of an example 100 associated with utilizing a shaped reflector for alternative microscopy lighting techniques. As shown in FIGS. 1A-1F, example 100 includes a microscope 105 and a fiber optic connector 110. The microscope 105 may include an optical microscope with or without a display, a video microscope used to view the fiber optic connector 110 and to determine imperfections in the fiber optic connector 110, and/or the like. The fiber optic connector 110 may include any fiber optic connector that includes an optical fiber, such as a fiber-optic connector (FC), an FC/physical content (PC) connector, an FC/angled physical content (APC) connector, a snap-in connector (SC), a straight tip (ST) connector, a small-form factor (LC) connector, and/or the like. Further details of the microscope 105 and the fiber optic connector 110 are provided elsewhere herein.

Figure 1A:
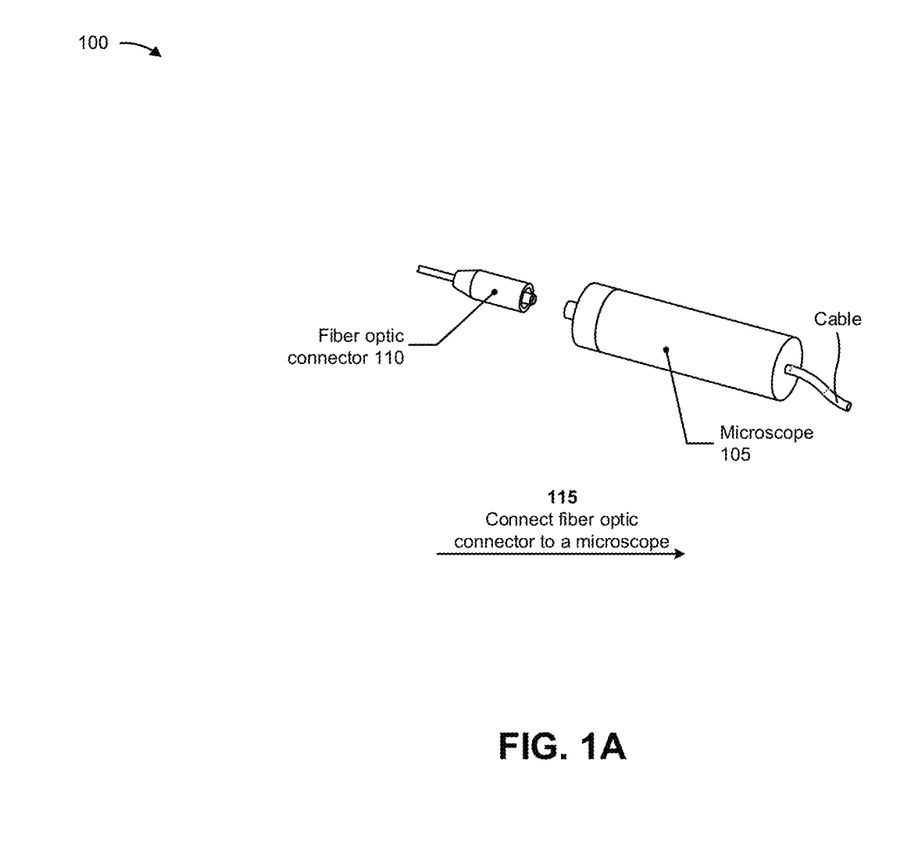
FIGS. 1A-1F are diagrams of an example implementation described herein.

As shown in FIG. 1A, and by reference number 115, the fiber optic connector 110 may be connected to the microscope 105. For example, the fiber optic connector 110 may be inserted into the microscope 105 so that the fiber optic connector 110 may be retained in and tested by the microscope 105. The fiber optic connector 110 may be retained the microscope 105 via a friction-based connection, a key or locking-based connection, and/or the like. Further details of the interconnection of the fiber optic connector 110 and the microscope 105 are provided elsewhere herein. As further shown in FIG. 1A, a cable may connect to the microscope 105 and may enable communication between the microscope 105 and other devices (e.g., a standalone computing device, a cloud-based device, a server device, and/or the like).

Figure 1B:
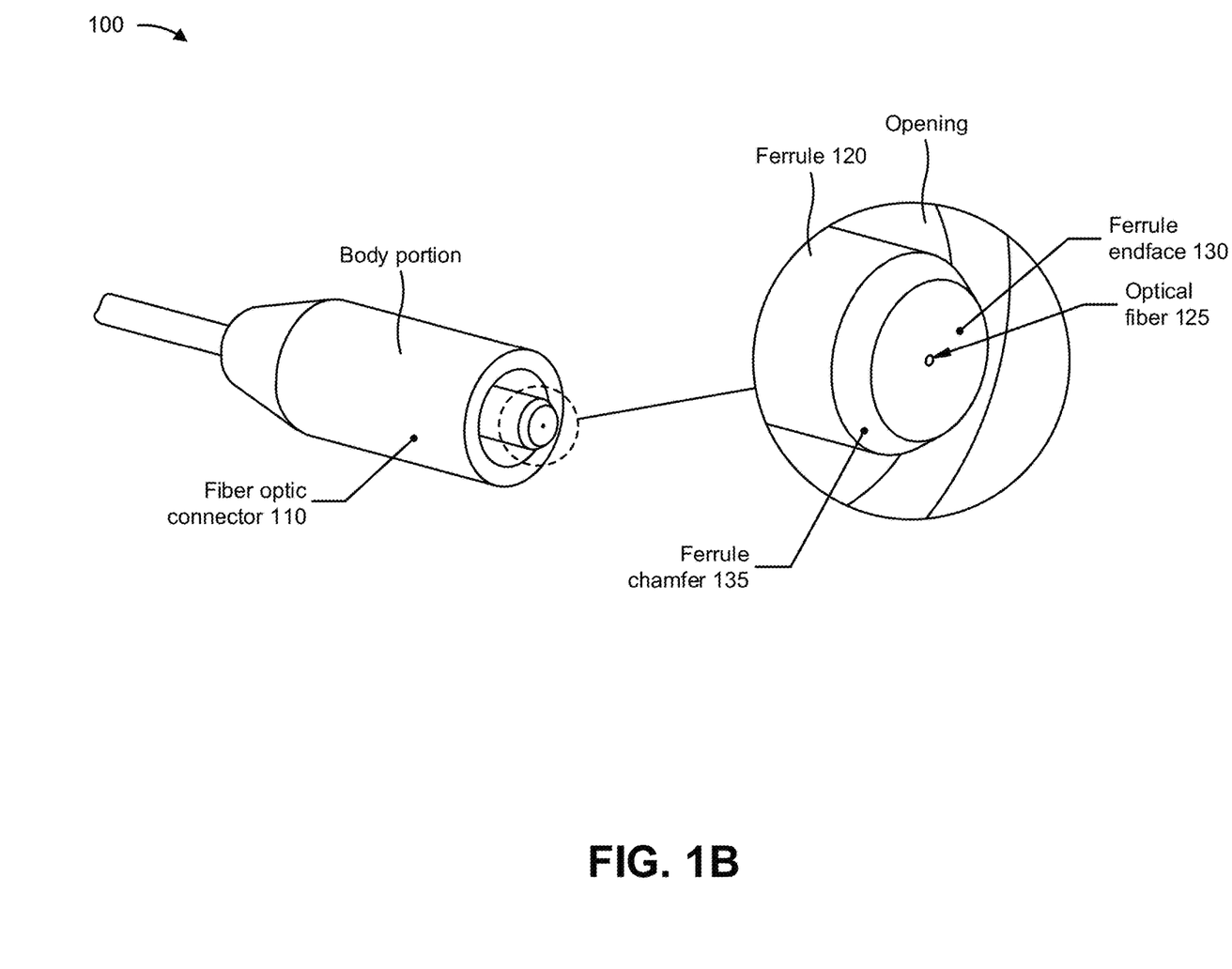

As shown in FIG. 1B, the fiber optic connector 110 may include a ferrule 120 that extends through a body portion of the fiber optic connector 110 and outward away from an opening of the body portion. The ferrule 120 may be cylindrical, square, rectangular, and/or the like in shape and may be made from a variety of materials, such as plastic, stainless steel, ceramic, and/or the like. The ferrule 120 may be sized and shaped based on an application of the fiber optic connector 110 (e.g., based on a size and shape associated with a mating fiber optic adapter). The ferrule 120 may include a bore through a central axis that includes an optical fiber 125. The optical fiber 125 may be fixed in place in the bore. The ferrule 120 may include a ferrule endface 130. Optical fiber 125 and ferrule endface 130 may be polished to a smooth finish (e.g., a surface with less than a threshold roughness). Ferrule 120 may include a ferrule chamfer 135 or a bevel provided at an edge formed between ferrule endface 130 and an outer surface of the body portion of the ferrule 120. The ferrule chamfer 135 may protect the edge from damage and may facilitate insertion into mating fiber optic adapters.

Figure 1C:
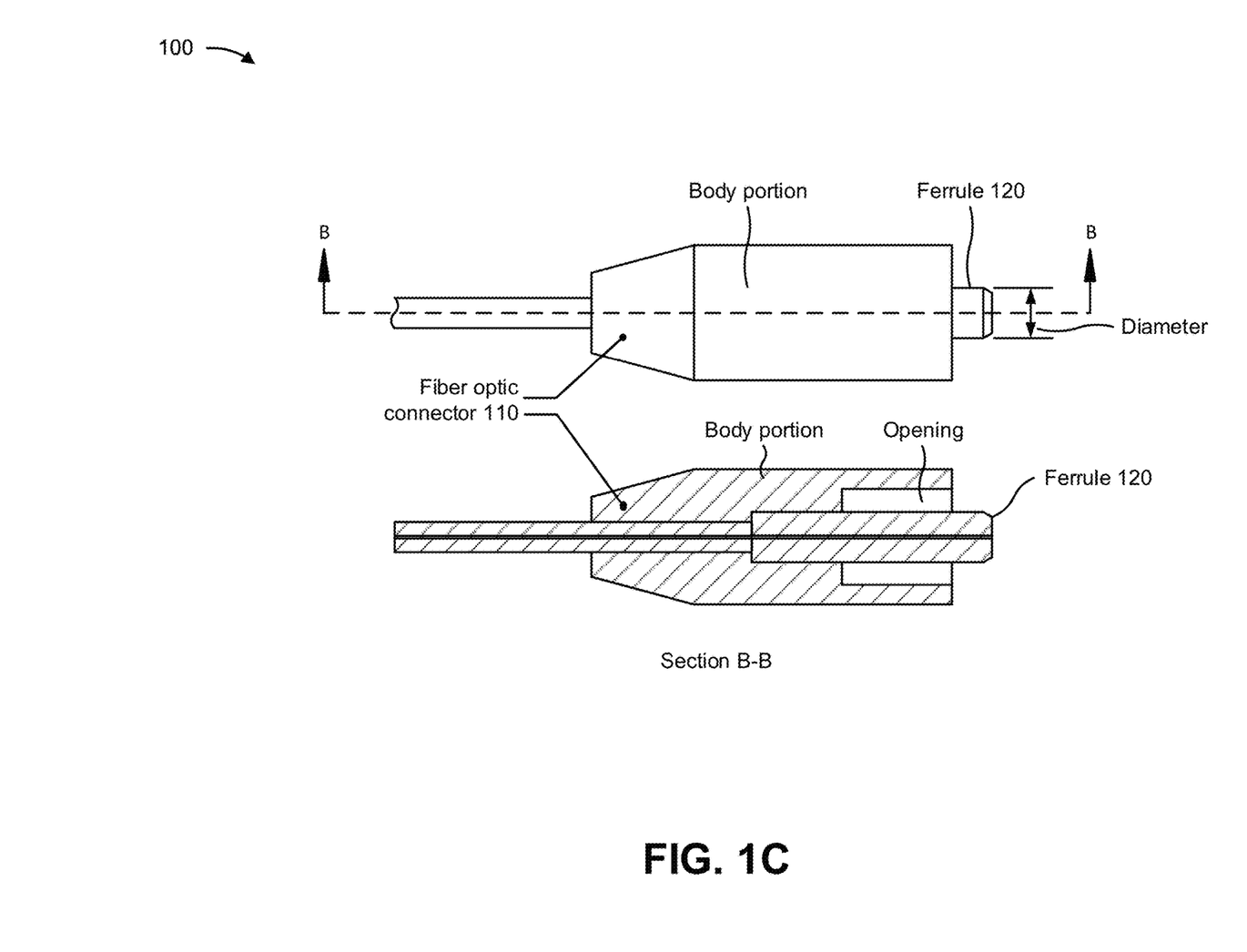

A side view of the fiber optic connector 110 is shown in the top part of FIG. 1C and a sectional view of the fiber optic connector 110, taken along line B-B of the side view, is shown in the bottom part of FIG. 1C. As shown in the side view, the ferrule 120 may include a diameter that is based on an application of the fiber optic connector 110. For example, the diameter may range from approximately one millimeter (1 mm) to approximately three millimeters (3 mm). As shown in the sectional view, the ferrule 120 may extend from within the body portion of fiber the optic connector 110, through the opening of the fiber optic connector 110, and away from the body portion and the opening.

Figure 1D:
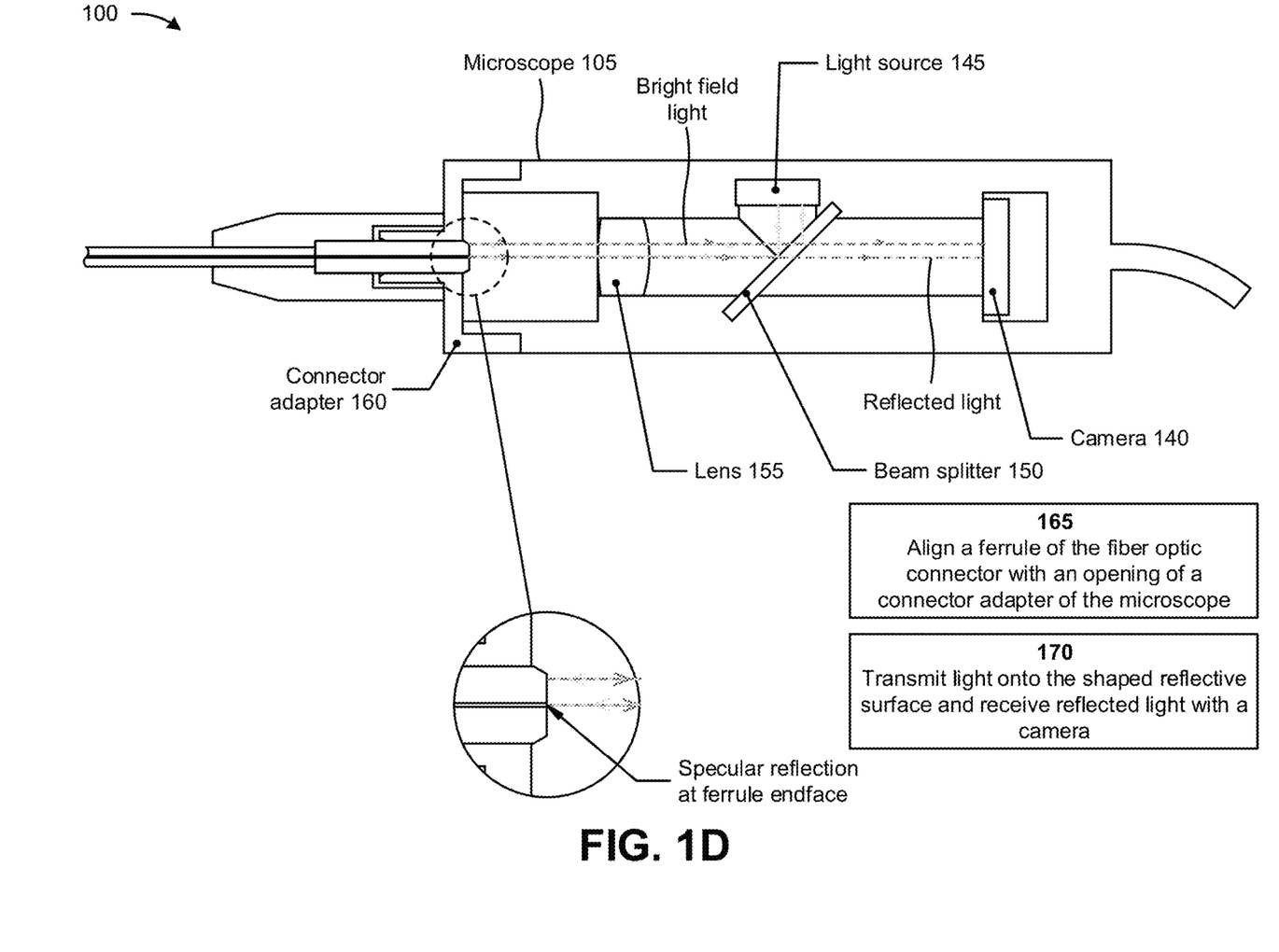

As shown in FIG. 1D, the microscope 105 may include a camera 140, a light source 145, a beam splitter 150, a lens 155, and a connector adapter 160. The camera 140 may include an image sensor that captures images provided by light reflected from the ferrule endface 130. For example, the camera 140 may include a complementary metal-oxide-semiconductor (CMOS) megapixel image sensor. The light source 145 may include a light-emitting diode (LED) light source, an incandescent light source, a fluorescent light source, a halogen light source, and/or the like that generates light. The beam splitter 150 may include an optical device that splits a beam of light in two. For example, the beam splitter 150 may include two triangular glass prisms that are joined together to form a cube, such that half of light incident on one face of the cube is reflected and another half of the light is transmitted due to frustrated total internal reflection.

In operation, the microscope 105 may utilize a shaped reflector and a single light source (e.g., the light source 145) to provide alternative microscopy lighting techniques that illuminate surfaces of the ferrule 120. As shown in FIG. 1D, half of the light (e.g., bright field light) emitted from the light source 145 of the microscope 105 reflects from the beam splitter 150 towards the lens 155. The light reflected from the beam splitter 150 passes through the lens 155 of the microscope 105 and reflects from the ferrule endface 130 and the optical fiber 125 as reflected light. The reflected light passes back through the lens 155 and forms an image of the optical fiber 125 and the ferrule endface 130 at the camera 140.

The connector adapter 160 may be sized and shaped to fit within and connect to an end portion of the microscope 105 (e.g., an end portion that is opposite of an end portion associated with the camera 140). The connector adapter 160 may be formed from a variety of materials (e.g., metal, plastic, glass, and/or the like), and may include an opening that is sized and shaped to receive and retain the ferrule 120 of the fiber optic connector 110. In some implementations, the opening of the connector adapter 160 is axially aligned with an axis of the ferrule 120 (e.g., the bore provided through the ferrule 120 and including the optical fiber 125).

In some implementations, as described below in connection with FIGS. 1E and 1F, the connector adapter 160 may include a shaped reflective surface provided around the opening of the connector adapter 160. A size and a shape of the shaped reflective surface may depend on a size and a shape of the ferrule 120, a size and a shape of the ferrule chamfer 135, the microscopy lighting technique to be provided by the microscope 105, and/or the like. The shaped reflective surface may be formed from a variety of materials, such as a polished metal, a coated glass, a metallized plastic, and/or the like. The connector adapter 160 may be removable and replaceable with other connector adapters that include different shaped reflective surfaces that provide different lighting techniques. The different lighting techniques may enable the microscope 105 to analyze the ferrule endface 130 and the ferrule chamfer 135, to provide dark field illumination that brightens features or contamination on the ferrule endface 135, to provide oblique illumination that enables different testing of the ferrule endface 130, and/or the like.

As further shown in FIG. 1D, and by reference number 165, the ferrule 120 of the fiber optic connector 110 may be aligned with and retained in the opening of the connector adapter 160 of the microscope 105. As shown by reference number 170, the bright field light from the light source 145 may be transmitted onto the optical fiber 125 and the ferrule endface 130 and may be received as reflected light with the camera 140. For example, and as shown in the magnified view of FIG. 1D, some of the bright field light may be transmitted to the optical fiber 125 and reflected by the optical fiber 125 as reflected light (e.g., specular reflected light). The reflected light from the optical fiber 125 may travel through the lens 155 and the beam splitter 150 and may be received by the camera 140. Some of the bright field light may be transmitted to the ferrule endface 130 and reflected by the ferrule endface 130 as reflected light (e.g., specular reflected light). The reflected light from the ferrule endface 130 may travel through the lens 155 and the beam splitter 150 and may be received by the camera 140.

Figure 1E:
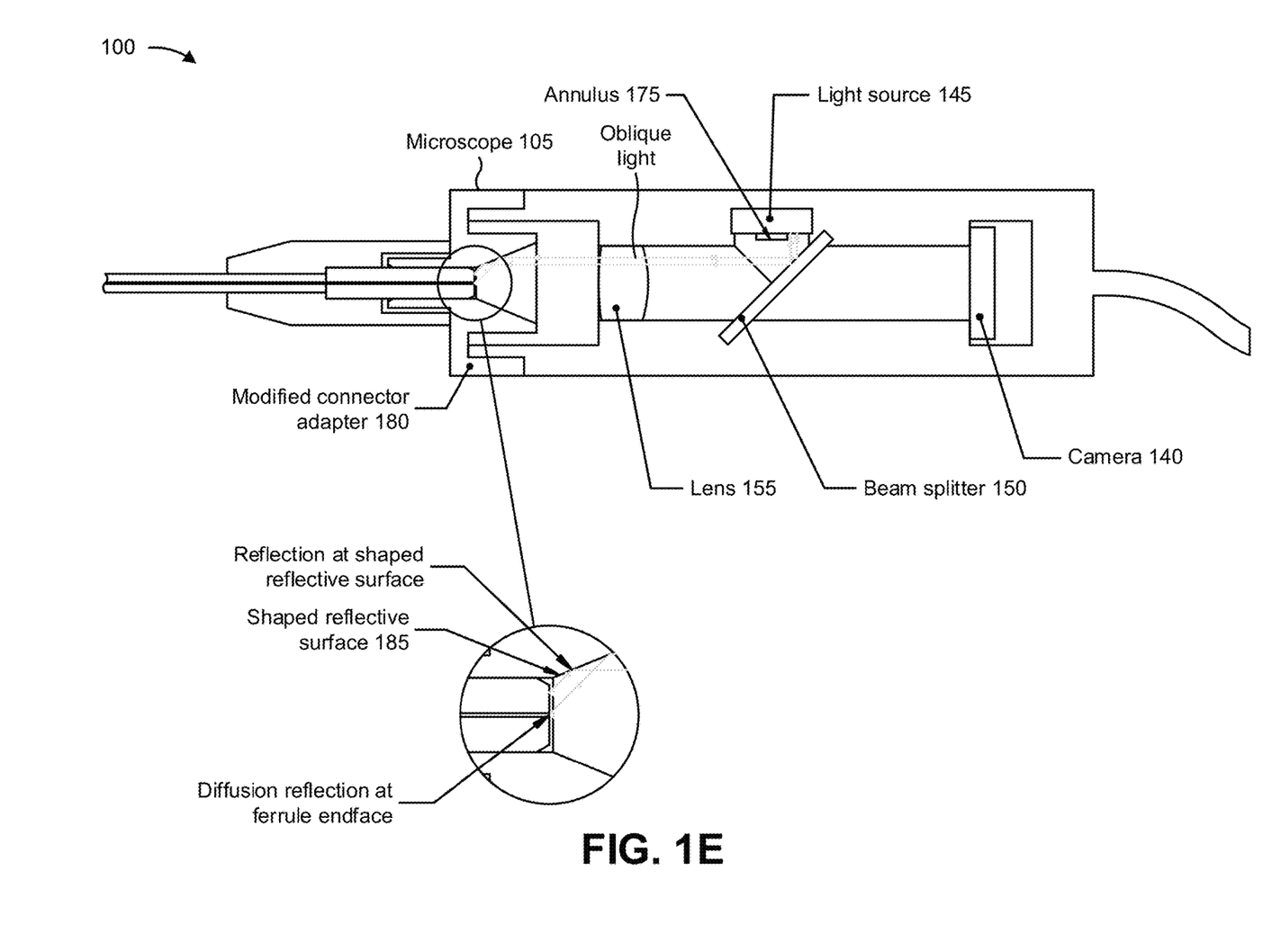

As shown in FIG. 1E, in some implementations, the microscope 105 includes an annulus 175 connected to the light source 145. The microscope 105 also includes a modified connector adapter 180 with a shaped reflective surface 185. The annulus 175 may create a hollow cone of illumination (e.g., oblique light) that comes to a focus on the beam splitter 150. Thus, the annulus 175 may enable the light source 145 to generate a particular microscopy lighting technique, such as an oblique light technique. In some implementations, the annulus 175 is removable and replaceable depending on a desired microscopy lighting technique.

The modified connector adapter 180 may include the features of the connector adapter 160 described above in connection with FIG. 1D. The shaped reflective surface 185 may be provided around the opening of the connector adapter 180. A size and a shape of the shaped reflective surface 185 may depend on a size and a shape of the ferrule 120, a size and a shape of the ferrule chamfer 135, the microscopy lighting technique to be provided by the microscope 105, and/or the like. The shaped reflective surface 185 may be formed from a variety of materials, such as a polished metal, a coated glass, a metallized plastic, and/or the like.

As further shown in FIG. 1E, the ferrule 120 of the fiber optic connector 110 may be aligned with and retained in the opening of the modified connector adapter 180 of the microscope 105. The oblique light from the light source 145 may be transmitted to the shaped reflective surface 185 and reflected onto the optical fiber 125 and the ferrule endface 130. For example, and as shown in the magnified view of FIG. 1E, some of the oblique light may be transmitted to the optical fiber 125 and reflected by the optical fiber 125 as reflected light (e.g., diffusion reflection). Diffusion reflection is a reflection of light from a surface such that a ray of light incident on the surface is scattered at many angles rather than at just one angle as in the case of specular reflection (e.g., as described above in connection with FIG. 1D). Some of the diffusion reflection from the optical fiber 125 may travel through the lens 155 and the beam splitter 150 and may be received by the camera 140. Some of the oblique light may be transmitted to the ferrule endface 130 and reflected by the ferrule endface 130 as reflected light (e.g., diffusion reflection). Some of the diffusion reflection from the ferrule endface 130 may travel through the lens 155 and the beam splitter 150 and may be received by the camera 140.

Figure 1F:
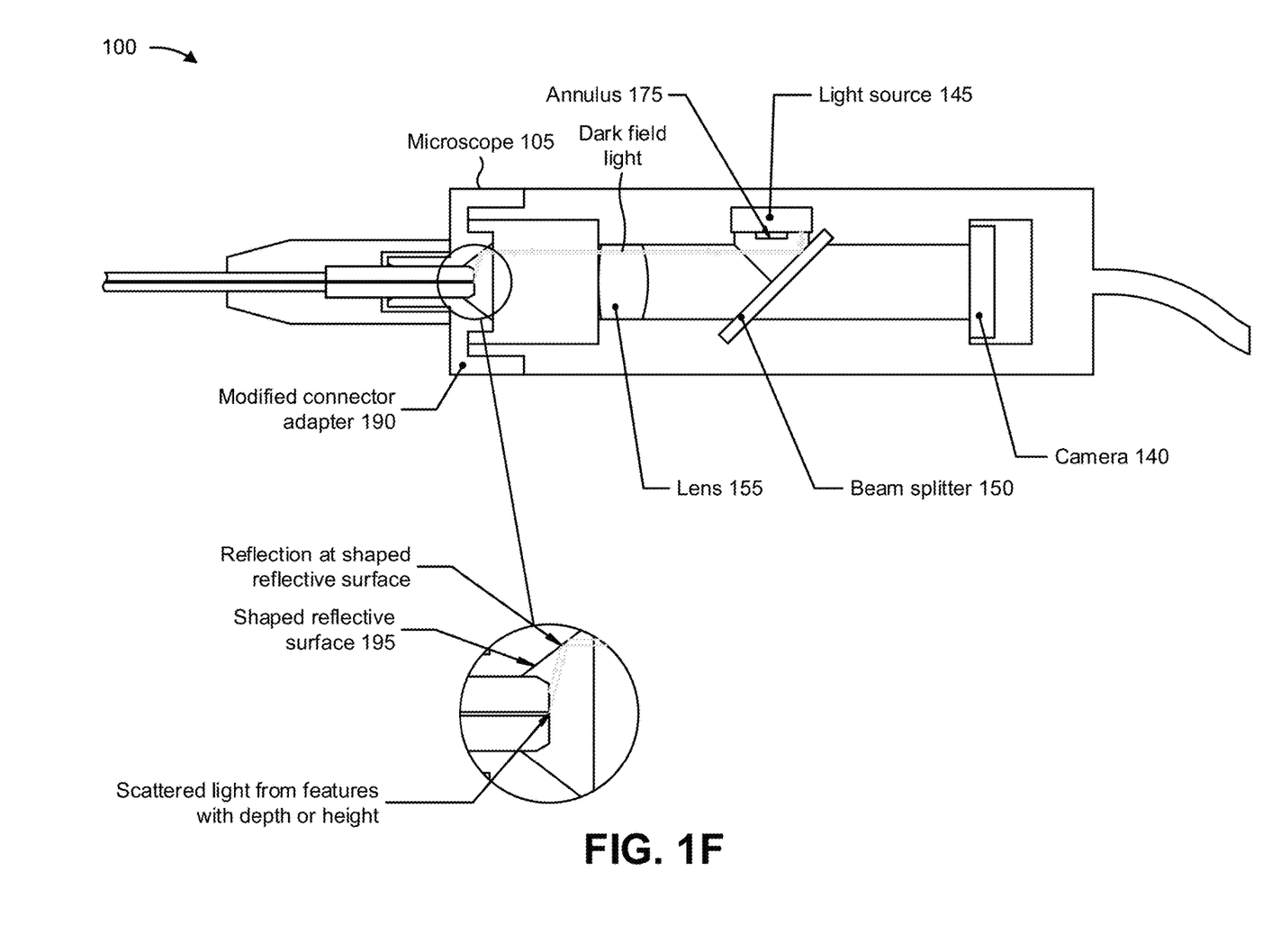

As shown in FIG. 1F, in some implementations, the microscope 105 includes the annulus 175 and a modified connector adapter 190 with a shaped reflective surface 195. The annulus 175 may include the features described above in connection with FIG. 1E. However, the annulus 175 may create a hollow cone of illumination (e.g., dark field light) that comes to a focus on the beam splitter 150. Thus, the annulus 175 may enable the light source 145 to generate a particular microscopy lighting technique, such as a dark field light technique.

The modified connector adapter 190 may include the features of the connector adapter 160 and/or the modified connector adapter 180 described above in connection with FIGS. 1D and 1E. The shaped reflective surface 195 may be provided around the opening of the connector adapter 190. A size and a shape of the shaped reflective surface 195 may depend on a size and a shape of the ferrule 120, a size and a shape of the ferrule chamfer 135, the microscopy lighting technique to be provided by the microscope 105, and/or the like. The shaped reflective surface 195 may be formed from a variety of materials, such as a polished metal, a coated glass, a metallized plastic, and/or the like.

As further shown in FIG. 1F, the ferrule 120 of the fiber optic connector 110 may be aligned with and retained in the opening of the modified connector adapter 190 of the microscope 105. The dark field light from the light source 145 may be transmitted to the shaped reflective surface 195 and reflected onto the optical fiber 125 and the ferrule endface 130. For example, and as shown in the magnified view of FIG. 1F, some of the dark field light may be transmitted to the optical fiber 125 and reflected by the optical fiber 125 as reflected light (e.g., scattered light from features of the ferrule endface 130 with depth or height). Some of the scattered light from the optical fiber 125 may travel through the lens 155 and the beam splitter 150 and may be received by the camera 140. Some of the dark field light may be transmitted to the ferrule endface 130 and reflected by the ferrule endface 130 as reflected light (e.g., scattered light from features of the ferrule endface 130 with depth or height). Some of the scattered light from the ferrule endface 130 may travel through the lens 155 and the beam splitter 150 and may be received by the camera 140.

In this way, the microscope 105 utilizes a shaped reflector for alternative microscopy lighting techniques. The microscope may include a reflector (e.g., the shaped reflective surface 185 or 195) with a geometry that allows illumination from a single light source to image the ferrule endface 130 with bright field illumination, oblique illumination, or dark field illumination. The light from the light source 145 is reflected by the reflector in such a way that subsequent light reflected from the ferrule endface 130 passes back through a lens. The ferrule endface 130 and the reflector may be conical and axially symmetric. This, in turn, conserves computing resources, networking resources, human resources, and/or the like that would otherwise have been consumed in switching light sources for different lighting effects, performing incorrect inspections of fiber optic connectors, incorrectly determining that faulty fiber optic connectors are functional, implementing faulty fiber optic connectors in networks, losing network data because of the faulty fiber optic connectors, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
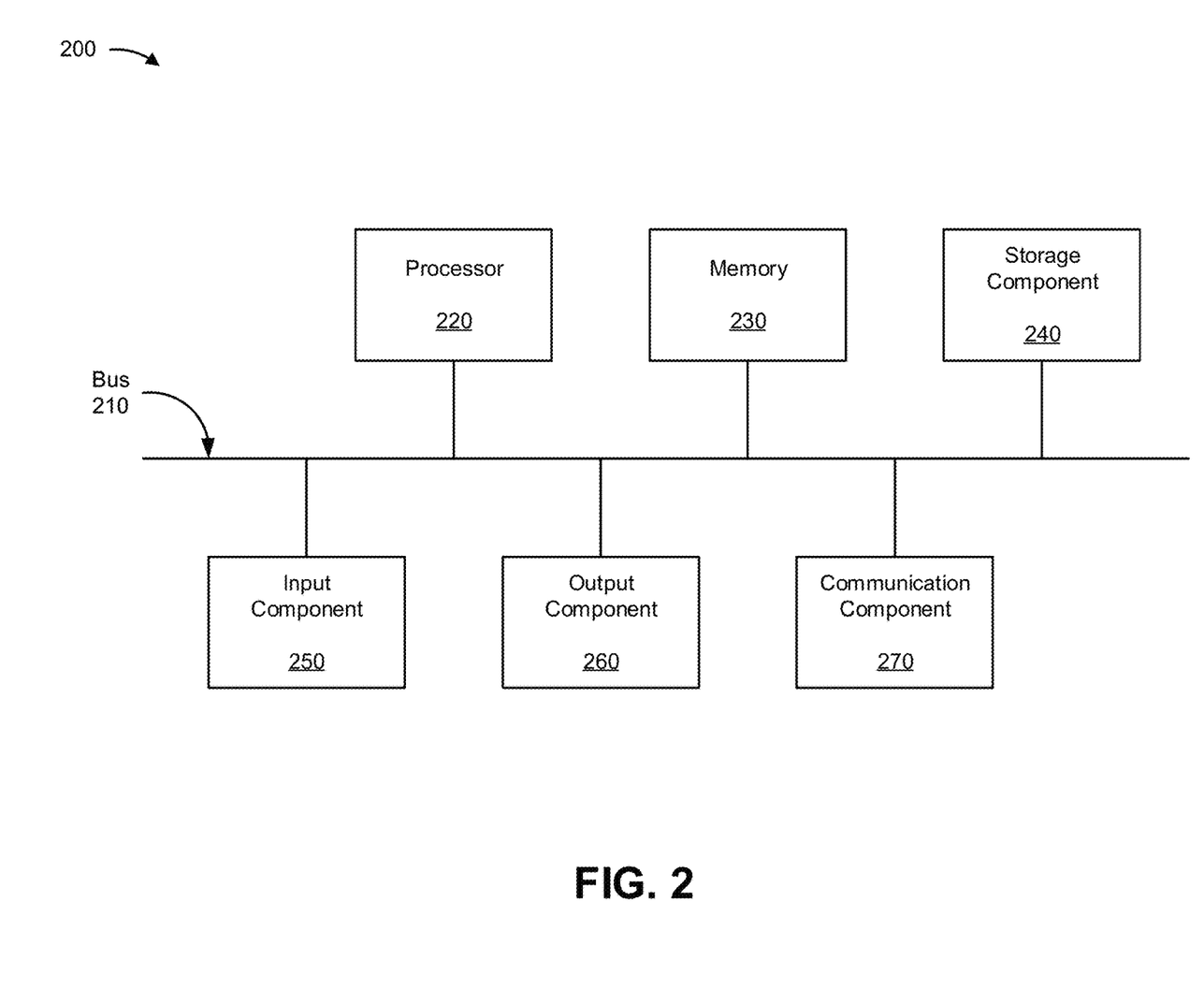
FIG. 2 is a diagram of example components of one or more devices of FIGS. 1A-1F.

FIG. 2 is a diagram of example components of a device 200, which may correspond to the microscope 105. In some implementations, the microscope 105 may include one or more devices 200 and/or one or more components of the device 200. As shown in FIG. 2, the device 200 may include a bus 210, a processor 220, a memory 230, a storage component 240, an input component 250, an output component 260, and a communication component 270.

The bus 210 includes a component that enables wired and/or wireless communication among the components of the device 200. The processor 220 includes a central processing unit, a graphics processing unit, a microprocessor, a controller, a microcontroller, a digital signal processor, a field-programmable gate array, an application-specific integrated circuit, and/or another type of processing component. The processor 220 is implemented in hardware, firmware, or a combination of hardware and software. In some implementations, the processor 220 includes one or more processors capable of being programmed to perform a function. The memory 230 includes a random-access memory, a read only memory, and/or another type of memory (e.g., a flash memory, a magnetic memory, and/or an optical memory).

The storage component 240 stores information and/or software related to the operation of the device 200. For example, the storage component 240 may include a hard disk drive, a magnetic disk drive, an optical disk drive, a solid-state disk drive, a compact disc, a digital versatile disc, and/or another type of non-transitory computer-readable medium. The input component 250 enables the device 200 to receive input, such as user input and/or sensed inputs. For example, the input component 250 may include a touch screen, a keyboard, a keypad, a mouse, a button, a microphone, a switch, a sensor, a global positioning system component, an accelerometer, a gyroscope, and/or an actuator. The output component 260 enables the device 200 to provide output, such as via a display, a speaker, and/or one or more light-emitting diodes. The communication component 270 enables the device 200 to communicate with other devices, such as via a wired connection and/or a wireless connection. For example, the communication component 270 may include a receiver, a transmitter, a transceiver, a modem, a network interface card, and/or an antenna.

The device 200 may perform one or more processes described herein. For example, a non-transitory computer-readable medium (e.g., the memory 230 and/or the storage component 240) may store a set of instructions (e.g., one or more instructions, code, software code, and/or program code) for execution by the processor 220. The processor 220 may execute the set of instructions to perform one or more processes described herein. In some implementations, execution of the set of instructions, by one or more processors 220, causes the one or more processors 220 and/or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
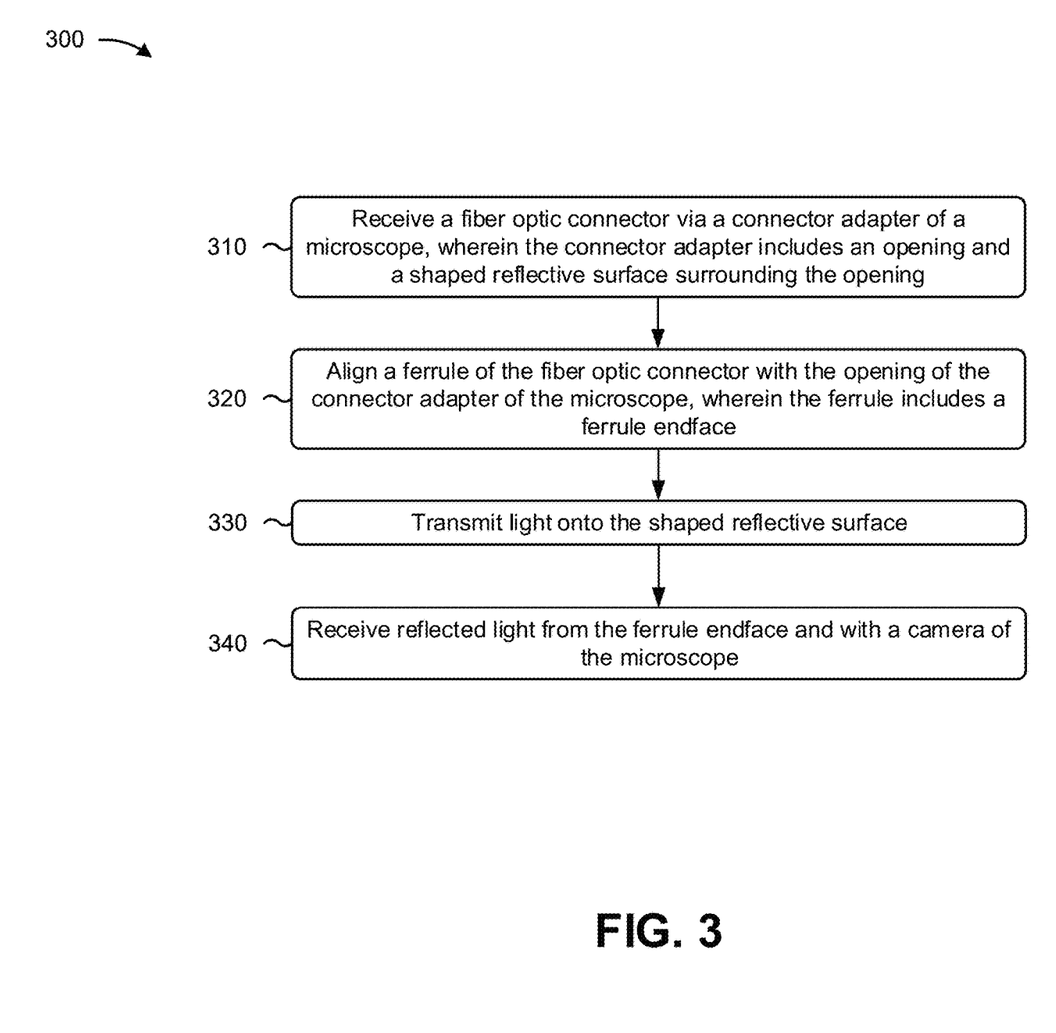
FIG. 3 is a flowchart of an example process for utilizing a shaped reflector for alternative microscopy lighting techniques.

FIG. 3 is a flowchart of an example process 300 for utilizing a shaped reflector for alternative microscopy lighting techniques. In some implementations, one or more process blocks of FIG. 3 may be performed by a microscope (e.g., the microscope 105). In some implementations, one or more process blocks of FIG. 3 may be performed by another device or a group of devices separate from or including the microscope. Additionally, or alternatively, one or more process blocks of FIG. 3 may be performed by one or more components of the device 200, such as the processor 220, the memory 230, the storage component 240, the input component 250, the output component 260, and/or the communication component 270.

As shown in FIG. 3, process 300 may include receiving a fiber optic connector via a connector adapter of the microscope, wherein the connector adapter includes an opening and a shaped reflective surface surrounding the opening (block 310). For example, the microscope may receive a fiber optic connector via a connector adapter of the microscope, as described above. In some implementations, the connector adapter includes an opening and a shaped reflective surface surrounding the opening. In some implementations, the connector adapter is removable and replaceable from the microscope. In some implementations, the shaped reflective surface includes one or more of a polished metal, a coated glass, or a metallized plastic.

In some implementations, the shaped reflective surface includes one of a first shaped reflective surface or a second shaped reflective surface, wherein a light source of the microscope is configured to transmit the light, as oblique light, onto the first shaped reflective surface, and wherein the light source is configured to transmit the light, as dark field light, onto the second shaped reflective surface.

As further shown in FIG. 3, process 300 may include aligning a ferrule of the fiber optic connector with the opening of the connector adapter of the microscope, wherein the ferrule includes a ferrule endface (block 320). For example, the microscope may align a ferrule of the fiber optic connector with the opening of the connector adapter of the microscope, as described above. In some implementations, the ferrule includes a ferrule endface. In some implementations, a size and a shape of the shaped reflective surface depends on one or more of a size and a shape of the ferrule, a size and a shape of the ferrule endface, or a type of the light transmitted onto the shaped reflective surface. In some implementations, the ferrule includes an axial bore through which an optical fiber is provided.

As further shown in FIG. 3, process 300 may include transmitting light onto the shaped reflective surface (block 330). For example, the microscope may transmit light onto the shaped reflective surface, as described above. In some implementations, transmitting the light onto the shaped reflective surface includes one of transmitting the light, as oblique light from a light source of the microscope, onto the shaped reflective surface, or transmitting the light, as dark field light from the light source, onto the shaped reflective surface.

As further shown in FIG. 3, process 300 may include receiving reflected light from the ferrule endface and with a camera of the microscope (block 340). For example, the microscope may receive reflected light from the ferrule endface and with a camera of the microscope, as described above. In some implementations, the light reflects from the shaped reflective surface and onto the ferrule endface to form the reflected light. In some implementations, the reflected light from the ferrule endface is imaged at the camera.

Process 300 may include additional implementations, such as any single implementation or any combination of implementations described below and/or in connection with one or more other processes described elsewhere herein.

In some implementations, process 300 includes determining, by the microscope, a result based on the reflected light received by the camera, and providing, by the microscope, the result for display.

In some implementations, process 300 includes receiving, by a beam splitter of the microscope, the light from a light source of the microscope; transmitting, by the beam splitter, the light onto the shaped reflective surface; receiving, by the beam splitter, the reflected light from the ferrule endface; and transmitting, by the beam splitter, the reflected light to the camera. In some implementations, the light source includes an annulus configured to cause the light source to generate the light as one of oblique light or dark field light.

In some implementations, process 300 includes receiving, by a lens provided between a light source and the connector adapter of the microscope, the light from the light source; transmitting, by the lens, the light onto the shaped reflective surface; receiving, by the lens, the reflected light from the ferrule endface; and transmitting, by the lens, the reflected light to the camera.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a microscope, a fiber optic connector via a connector adapter of the microscope,
      wherein the connector adapter includes an opening and a shaped reflective surface surrounding the opening;
   aligning, by the microscope, a ferrule of the fiber optic connector with the opening of the connector adapter of the microscope,
      wherein the ferrule includes a ferrule endface;
   transmitting, by the microscope, light onto the shaped reflective surface,
      wherein the light is a single light source configurable for multiple alternative microscopy lighting techniques,
         wherein the single light source is configured to be used with the shaped reflective surface to provide a first microscopy lighting technique of the multiple alternative microscopy lighting techniques, and
         wherein the single light source is configured to provide a second microscopy lighting technique, different than the first microscopy lighting technique and of the multiple alternative microscopy lighting techniques, when used with another shaped reflective surface; and
   receiving, by the microscope, reflected light from the ferrule endface and with a camera of the microscope.

2. The method of claim 1, wherein the light reflects from the shaped reflective surface and onto the ferrule endface to form the reflected light.

3. The method of claim 1, further comprising:
   determining, by the microscope, a result based on the reflected light received by the camera; and
   providing, by the microscope, the result for display.

4. The method of claim 1, wherein transmitting the light onto the shaped reflective surface comprises one of:
   transmitting the light, as oblique light from a light source of the microscope, onto the shaped reflective surface; or
   transmitting the light, as dark field light from the light source, onto the shaped reflective surface.

5. The method of claim 1, wherein a size and a shape of the shaped reflective surface depends on one or more of:
- a size and a shape of the ferrule,
- a size and a shape of the ferrule endface, or
- a type of the light transmitted onto the shaped reflective surface.

6. A microscope, comprising:
- a connector adapter that includes an opening and a shaped reflective surface surrounding the opening,
  - wherein the connector adapter is configured to align a ferrule of a fiber optic connector with the opening of the connector adapter,
  - wherein the ferrule includes a ferrule endface;
- a light source configured to transmit light to the shaped reflective surface and onto the ferrule endface,
  - wherein the light is a single light source configurable for multiple alternative microscopy lighting techniques,
    - wherein the single light source is configured to be used with the shaped reflective surface to provide a first microscopy lighting technique of the multiple alternative microscopy lighting techniques, and
    - wherein the single light source is configured to provide a second microscopy lighting technique, different than the first microscopy lighting technique and of the multiple alternative microscopy lighting techniques, when used with another shaped reflective surface; and
- a camera configured to receive reflected light from the ferrule endface.

7. The microscope of claim 6, further comprising:
a beam splitter configured to:
- receive the light from the light source,
- transmit the light onto the shaped reflective surface,
- receive the reflected light from the ferrule endface, and
- transmit the reflected light to the camera.

8. The microscope of claim 6, wherein the shaped reflective surface includes one of a first shaped reflective surface or a second shaped reflective surface,
- wherein the light source is configured to transmit the light, as oblique light, onto the first shaped reflective surface, and
- wherein the light source is configured to transmit the light, as dark field light, onto the second shaped reflective surface.

9. The microscope of claim 6, wherein the light source includes an annulus configured to cause the light source to generate the light as one of oblique light or dark field light.

10. The microscope of claim 6, further comprising:
one or more processors configured to:
- determine a result based on the reflected light received by the camera; and
- provide the result for display.

11. The microscope of claim 6, wherein the reflected light from the ferrule endface is imaged at the camera.

12. The microscope of claim 6, further comprising:
a lens, provided between the light source and the connector adapter, configured to:
- receive the light from the light source,
- transmit the light onto the shaped reflective surface,
- receive the reflected light from the ferrule endface, and
- transmit the reflected light to the camera.

13. The microscope of claim 6, wherein the shaped reflective surface includes one or more of:
- a polished metal,
- a coated glass, or
- a metallized plastic.

14. The microscope of claim 6, wherein the light reflects from the shaped reflective surface and onto the ferrule endface to form the reflected light.

15. The microscope of claim 6, wherein a size and a shape of the shaped reflective surface depends on a size and a shape of the ferrule and on a size and a shape of the ferrule endface.

16. The microscope of claim 6, wherein the ferrule includes an axial bore through which an optical fiber is provided.

17. The microscope of claim 6, wherein the connector adapter is removable and replaceable from the microscope.

18. A connector adapter, comprising:
- a body portion configured to connect with an optical microscope,
  - wherein the body portion includes an opening that is configured to receive and retain a ferrule of a fiber optic connector,
  - wherein the ferrule includes a ferrule endface; and
- a shaped reflective surface surrounding the opening and being configured to:
  - receive light from a light source of the optical microscope,
    - wherein the light is a single light source configurable for multiple alternative microscopy lighting techniques,
      - wherein the single light source is configured to be used with the shaped reflective surface to provide a first microscopy lighting technique of the multiple alternative microscopy lighting techniques, and
      - wherein the single light source is configured to provide a second microscopy lighting technique, different than the first microscopy lighting technique and of the multiple alternative microscopy lighting techniques,
    - when used with another shaped reflective surface, and
  - reflect the light, as reflected light, to a camera of the optical microscope and via the ferrule endface.

19. The connector adapter of claim 18, wherein a size and a shape of the shaped reflective surface depends on one or more of:
- a size and a shape of the ferrule,
- a size and a shape of the ferrule endface, or
- a type of the light transmitted onto the shaped reflective surface.

20. The connector adapter of claim 18, wherein the shaped reflective surface includes one or more of:
- a polished metal,
- a coated glass, or
- a metallized plastic.

* * * * *